(12) United States Patent
Jilani et al.

(10) Patent No.: US 11,495,813 B2
(45) Date of Patent: Nov. 8, 2022

(54) MEMBRANE ELECTRODE ASSEMBLY, FUEL CELL STACK, AND VEHICLE COMPRISING SUCH A FUEL CELL STACK

(71) Applicants: AUDI AG, Ingolstadt (DE); VOLKSWAGEN AG, Wolfsburg (DE)

(72) Inventors: Adel Jilani, Burnaby (CA); Sanjiv Kumar, Burnaby (CA); Sebastian Voigt, Vancouver (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 309 days.

(21) Appl. No.: 16/645,218

(22) PCT Filed: Aug. 6, 2018

(86) PCT No.: PCT/EP2018/071215
§ 371 (c)(1),
(2) Date: Aug. 11, 2020

(87) PCT Pub. No.: WO2019/048156
PCT Pub. Date: Mar. 14, 2019

(65) Prior Publication Data
US 2021/0028476 A1 Jan. 28, 2021

(30) Foreign Application Priority Data
Sep. 7, 2017 (DE) .................... 10 2017 215 741.0

(51) Int. Cl.
*H01M 8/1004* (2016.01)
*H01M 4/86* (2006.01)
(Continued)

(52) U.S. Cl.
CPC ....... *H01M 8/1004* (2013.01); *H01M 4/8626* (2013.01); *H01M 8/0267* (2013.01);
(Continued)

(58) Field of Classification Search
CPC ............. H01M 8/1004; H01M 8/0267; H01M 2008/1095; H01M 4/8626
See application file for complete search history.

(56) References Cited

U.S. PATENT DOCUMENTS 6,379,827 B1 4/2002 Cipollini
2003/0157396 A1 8/2003 Beckmann et al.
(Continued)

FOREIGN PATENT DOCUMENTS

DE 10 2005 051 162 A1 4/2007
DE 10 2013 006 360 A1 3/2014
(Continued)

*Primary Examiner* — Eugenia Wang
(74) *Attorney, Agent, or Firm* — Seed Intellectual Property Law Group LLP

(57) ABSTRACT

Embodiments of the invention relate to a membrane-electrode assembly comprising a membrane structure with an anode layer, a cathode layer, and a membrane layer, wherein the membrane layer is positioned between the anode layer and the cathode layer. The membrane-electrode assembly furthermore comprises an anode-side gas-diffusion layer arranged on the anode layer and a cathode-side gas-diffusion layer arranged on the cathode layer. Furthermore, at least one of the anode-side gas-diffusion and the cathode-side gas-diffusion layers has a structure on the side facing away from the membrane structure. According to some embodiments, the structure comprises a plurality of columns for forming a laterally-open flow field, wherein the columns have support surfaces for supporting a bipolar plate.

10 Claims, 2 Drawing Sheets

(51) Int. Cl.
  *H01M 8/0267* (2016.01)
  *H01M 8/10* (2016.01)
  *H01M 8/04029* (2016.01)

(52) U.S. Cl.
  CPC ............ *H01M 8/04029* (2013.01); *H01M 2008/1095* (2013.01); *H01M 2250/20* (2013.01)

(56) References Cited

U.S. PATENT DOCUMENTS

| | | |
|---|---|---|
| 2006/0046118 A1 | 3/2006 | Suh et al. |
| 2008/0226967 A1* | 9/2008 | Tighe ............... H01M 8/2483 429/430 |
| 2009/0214929 A1* | 8/2009 | Gao ................ H01M 8/0258 429/457 |
| 2014/0120457 A1 | 5/2014 | Choi et al. |
| 2014/0329167 A1 | 11/2014 | Okanishi et al. |

FOREIGN PATENT DOCUMENTS

| | | | |
|---|---|---|---|
| DE | 10 2016 201 707 A1 | 8/2017 | |
| EP | 1 796 192 A1 | 6/2007 | |
| EP | 2 996 184 A1 | 3/2016 | |
| EP | 3 316 367 A1 | 5/2018 | |
| GB | 2336712 A * | 10/1999 | .......... H01M 8/0234 |
| JP | 2009-99262 A | 5/2009 | |

\* cited by examiner

MEMBRANE ELECTRODE ASSEMBLY, FUEL CELL STACK, AND VEHICLE COMPRISING SUCH A FUEL CELL STACK

BACKGROUND

Technical Field

Embodiments of the invention relate to membrane-electrode assemblies and fuel-cell stacks with such membrane-electrode assemblies. Embodiments of the invention also relate to a vehicle comprising such a fuel-cell stack.

Description of the Related Art

Fuel cells use the chemical conversion of a fuel with oxygen into water in order to generate electrical energy. For this purpose, fuel cells contain the so-called membrane-electrode assembly (MEA) as a core component, which is an arrangement of an ion-conducting (usually proton-conducting) membrane and of a catalytic electrode (anode and cathode), respectively arranged on both sides of the membrane. The latter generally comprise supported precious metals—in particular, platinum. In addition, gas-diffusion layers (GDL's) can be arranged on both sides of the membrane-electrode assembly, on the sides of the electrodes facing away from the membrane. Generally, the fuel cell is formed by a plurality of MEA's arranged in the stack, the electrical power outputs of which add up. Between the individual membrane-electrode assemblies, bipolar plates (also called flow-field plates or separator plates) are usually arranged, which ensure a supply of the individual cells with the operating media, i.e., the reactants, and are usually also used for cooling. In addition, the bipolar plates also ensure an electrically-conductive contact to the membrane-electrode assemblies.

While the fuel cell is operating, the fuel (anode operating medium)—in particular, hydrogen $H_2$ or a hydrogen-containing gas mixture—is supplied to the anode via an anode-side open flow field of the bipolar plate, where electrochemical oxidation of $H_2$ into protons $H^+$ occurs with the release of electrons ($H_2 \rightarrow 2\ H^+ + 2\ e^-$). Protons are transported (in a water-bound or water-free manner) from the anode chamber into the cathode chamber across the electrolyte or membrane that separates and electrically insulates the reaction chambers in a gastight manner from each other. The electrons provided at the anode are guided to the cathode via an electrical line. Oxygen or an oxygen-containing gas mixture (such as air) as the cathode operating medium is supplied to the cathode via a cathode-side open flow field of the bipolar plate so that a reduction of $O_2$ to $O^{2-}$ occurs with the accretion of electrons ($½\ O_2 + 2\ e^- \rightarrow O^{2-}$). At the same time, in the cathode chamber, the oxygen anions react with the protons transported across the membrane, forming water ($O^{2-} + 2\ H^+ \rightarrow H_2O$).

The fuel-cell stack is supplied with its operating media, i.e., the anode operating gas (e.g., hydrogen), the cathode operating gas (e.g., air), and the coolant, by means of main supply channels, which run through the stack in its entire stacking direction and from which the operating media are supplied to the individual cells via the bipolar plates. There are at least two such main supply channels available for each operating medium, viz., one for supplying and one for discharging the respective operating medium.

Fuel-cell stacks are subject to compression pressures, wherein hardware springs, which add significant weight, are typically used.

BRIEF SUMMARY

Embodiments of the invention are now based on the aim of proposing a membrane-electrode assembly and a fuel-cell stack with such a membrane-electrode assembly, which improve the compression properties and the structural design of the fuel-cell stack.

This aim is achieved by a membrane-electrode assembly, a fuel-cell stack with such a membrane-electrode assembly, and a vehicle with such a fuel-cell stack with features as described herein.

In some embodiments, a membrane-electrode assembly comprises a membrane structure with an anode layer, a cathode layer, and a membrane layer, wherein the membrane layer is positioned between the anode layer and the cathode layer. The membrane-electrode assembly also comprises an anode-side gas-diffusion layer arranged on the anode layer. The membrane-electrode assembly also comprises a cathode-side gas-diffusion layer arranged on the cathode layer. Furthermore, at least one of the anode-side gas-diffusion and the cathode-side gas-diffusion layers has a structure on the side facing away from the membrane structure. According to some embodiments, the structure comprises a plurality of columns for forming a laterally-open flow field, wherein the columns have support surfaces for supporting a bipolar plate. By means of the columns of the gas-diffusion layer, a spring action under compression is, advantageously, achieved, as a result of which a hardware spring, for example, can be replaced. Furthermore, induced voltages are also reduced by these columns.

The anode-side gas-diffusion layer may have a first structure on the side facing away from the membrane structure, and the cathode-side gas-diffusion layer has a second structure on the side facing away from the membrane structure, wherein the first structure comprises a plurality of first columns for forming a laterally-open flow field, wherein the first columns have first support surfaces for supporting a bipolar plate. Furthermore, the second structure comprises a plurality of second columns, wherein the second columns have second support surfaces for supporting a bipolar plate. This results in a column structure on both sides, as a result of which the spring action is further improved or amplified. Induced voltages can also be further reduced.

First columns and second columns may be positioned such that a second column is positioned opposite each first column with respect to the membrane structure. This results in a column structure on both sides, wherein the columns form a linear arrangement. The compression properties and the spring action are thereby further amplified.

The first column may have a first height, and the second column may have a second height, wherein the first height and/or the second height is 250-450 μm, such as 300-400 μm, and in some embodiments 350 μm. These heights are particularly suitable for making the design particularly robust. In particular, this thickness brings about a stiffness for achieving a resilient effect.

A further aspect relates to a fuel-cell stack comprising a stack of bipolar plates and membrane-electrode assemblies alternately arranged between two end plates. Such a fuel-cell stack has increased structural integrity because of the columnar structure of the membrane-electrode assembly. An additional hardware spring can be dispensed with. The weight of the fuel-cell stack can thereby also be significantly reduced.

The bipolar plate may comprise an anode plate, the anode side of which faces the anode-side gas-diffusion layer of the membrane-electrode assembly, and a cathode plate, the cathode side of which faces the cathode-side gas-diffusion layer of the membrane-electrode assembly, wherein the anode side of the anode plate and/or the cathode side of the cathode plate are flat. The bipolar plate is accordingly unstructured on one side, which reduces production costs and ensures secure support of the bipolar plate.

Advantageously, at least one of the coolant sides of the anode plate or of the cathode plate comprises a third structure for forming a laterally-open coolant flow field, and the third structure comprises a plurality of third columns, wherein the third columns are positioned with the first columns and the second columns one above the other along a stacking direction. In other words, all columns are stacked one above the other. This results in a further improved spring action by the column structure, and the structural robustness of the bipolar plates is increased.

Either the anode plate or the cathode plate may be flat on both sides. The simplicity of the bipolar plate makes it possible to reduce costs and production effort. In addition, the bipolar plate can be designed to be particularly stable.

Another aspect relates to a fuel-cell system that has a fuel-cell stack as described herein. In particular, the fuel-cell system has an anode supply and a cathode supply with the corresponding peripheral components, in addition to the fuel-cell stack.

Another aspect relates to a vehicle with a fuel-cell stack as described herein. The vehicle may be an electric vehicle in which an electrical energy generated by the fuel-cell system serves to supply an electric traction motor and/or a traction battery.

Aspects and features of the various embodiments described herein may be combined with each other unless stated otherwise in individual cases.

BRIEF DESCRIPTION OF THE SEVERAL VIEWS OF THE DRAWINGS

Embodiments of the invention are explained below with reference to the respective drawings. The following is shown.

DETAILED DESCRIPTION

Figure 1:
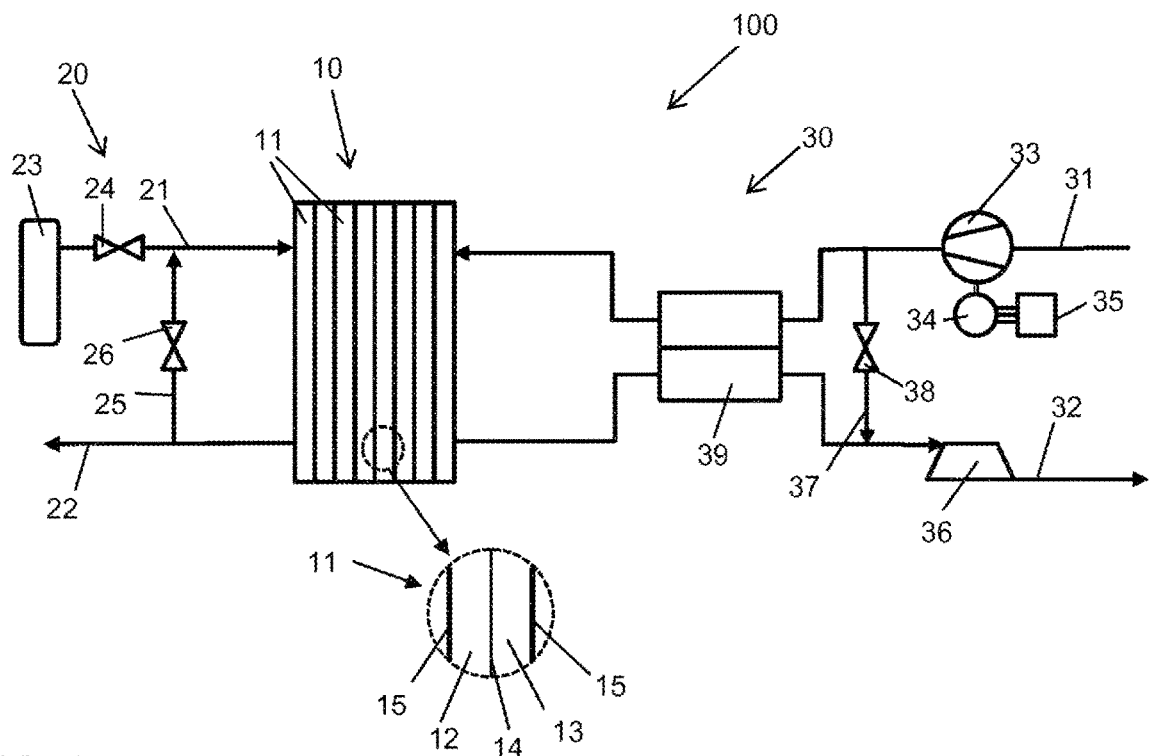
FIG. 1 is a block diagram of a fuel-cell system according to one embodiment.

FIG. 1 shows a fuel-cell system, denoted overall by 100. The fuel-cell system 100 is part of a vehicle (not further illustrated)—in particular, an electric vehicle—which has an electric traction motor, which is supplied with electrical energy by the fuel-cell system 100.

The fuel-cell system 100 comprises as core components a fuel-cell stack 10, which has a plurality of individual cells 11, which are arranged in the form of a stack and which are formed by alternately-stacked membrane-electrode assemblies (MEA's) 14 and bipolar plates 15 (see detail cutout). Each individual cell 11 thus comprises, in each case, an MEA 14 comprising a membrane layer, which may be an ionically-conductive, polymer electrolyte membrane, as well as catalytic electrodes arranged thereon on both sides, viz., an anode layer and a cathode layer, which catalyze the respective partial reaction of the fuel cell conversion and are, in particular, designed as coatings on the membrane layer. The anode electrode and cathode electrode have a catalytic material, e.g., platinum, which is supported on an electrically-conductive carrier material with a large specific surface—for example, a carbon-based material. An anode chamber 12 is thus formed between a bipolar plate 15 and the anode, and the cathode chamber 13 is thus formed between the cathode and the next bipolar plate 15. The bipolar plates 15 also establish the electrical connection between the individual fuel cells 11. In addition, they have a system of inner coolant channels, which serve the passage of a coolant and thus the temperature control of the stack 10. The membrane-electrode assembly 14 also comprises gas-diffusion layers 1410, 1420, which face the bipolar plates 15.

In order to supply the fuel-cell stack 10 with the operating media, the fuel-cell system 100 has, on the one hand, an anode supply 20 and, on the other, a cathode supply 30.

The anode supply 20 comprises an anode supply path 21, which serves to supply an anode operating medium (the fuel), e.g., hydrogen, to the anode chambers 12 of the fuel-cell stack 10. For this purpose, the anode supply path 21 connects a fuel reservoir 23 to an anode inlet of the fuel-cell stack 10. The anode supply 20 also comprises an anode exhaust path 22 which discharges the anode exhaust gas from the anode chambers 12 via an anode outlet of the fuel-cell stack 10. The anode operating pressure on the anode sides 12 of the fuel-cell stack 10 is adjustable via an adjustment means 24 in the anode supply path 21. The anode supply 20 may additionally have a fuel recirculation line 25 which connects the anode exhaust path 22 to the anode supply path 21, as shown. Arranged in the fuel recirculation line 25 is a conveying device 26, e.g., an electromotively-driven compressor, which brings about conveying of the anode exhaust gas. The recirculation of fuel is customary in order to return the mostly over-stoichiometrically-supplied fuel to the stack and to use it.

The cathode supply 30 comprises a cathode supply path 31 which supplies an oxygen-containing cathode operating medium to the cathode chambers 13 of the fuel-cell stack 10—in particular, air which is sucked in from the environment. The cathode supply 30 also comprises a cathode exhaust path 32, which discharges the cathode exhaust gas (in particular, the exhaust air) from the cathode chambers 13 of the fuel-cell stack 10 and supplies it, if appropriate, to an exhaust system (not shown). A compressor 33 is arranged in the cathode supply path 31 for conveying and compressing the cathode operating medium. In the embodiment shown, the compressor 33 is designed as a compressor which is driven mainly by an electric motor, the drive of said compressor being effected via an electric motor 34 equipped with a corresponding power electronics system 35. The compressor 33 may also be driven, assisted by a common shaft, by a turbine 36 (optionally, with variable turbine geometry) disposed in the cathode exhaust path 32.

In accordance with the illustrated embodiment, the cathode supply 30 can also have a wastegate line 37 which connects the cathode supply path 31 to the cathode exhaust path 32, i.e., constitutes a bypass of the fuel-cell stack 10. The wastegate line 37 allows excess air mass flow past the fuel-cell stack 10 without shutting down the compressor 33. An adjustment means 38 arranged in the wastegate line 37 serves to control the amount of the cathode operating medium bypassing the fuel-cell stack 10. All adjustment means 24, 38 of the fuel-cell system 100 can be designed as controllable or non-controllable valves or flaps. Corresponding additional adjustment means may be arranged in the lines 21, 22, 31, and 32 in order to be able to isolate the fuel-cell stack 10 from the environment.

The fuel-cell system 100 can furthermore have a humidifier 39. The humidifier 39 is, on the one hand, arranged in the cathode supply path 31 such that the cathode operating gas can flow through it. On the other hand, the arrangement in the cathode exhaust path 32 allows the cathode exhaust gas to flow through it. The humidifier 39 typically has several membranes permeable by water vapor which are designed to be either flat or in the form of hollow fibers. In this case, the comparatively dry cathode operating gas (air) flows over one side of the membranes, and the comparatively moist cathode exhaust gas (exhaust gas) flows over the other side. Driven by the higher partial pressure of the water vapor in the cathode exhaust gas, water vapor passes over the membrane into the cathode operating gas, which is humidified in this way.

Various further details of the anode and cathode supply 20, 30 are not shown in the simplified FIG. 1 for reasons of clarity. For example, a water separator can be installed in the anode and/or cathode exhaust path 22, 32 in order to condense and drain product water arising from the fuel-cell reaction. The anode exhaust path 22 can finally open into the cathode exhaust path 32 so that the anode exhaust gas and the cathode exhaust gas are discharged via a common exhaust system.

Figure 2:
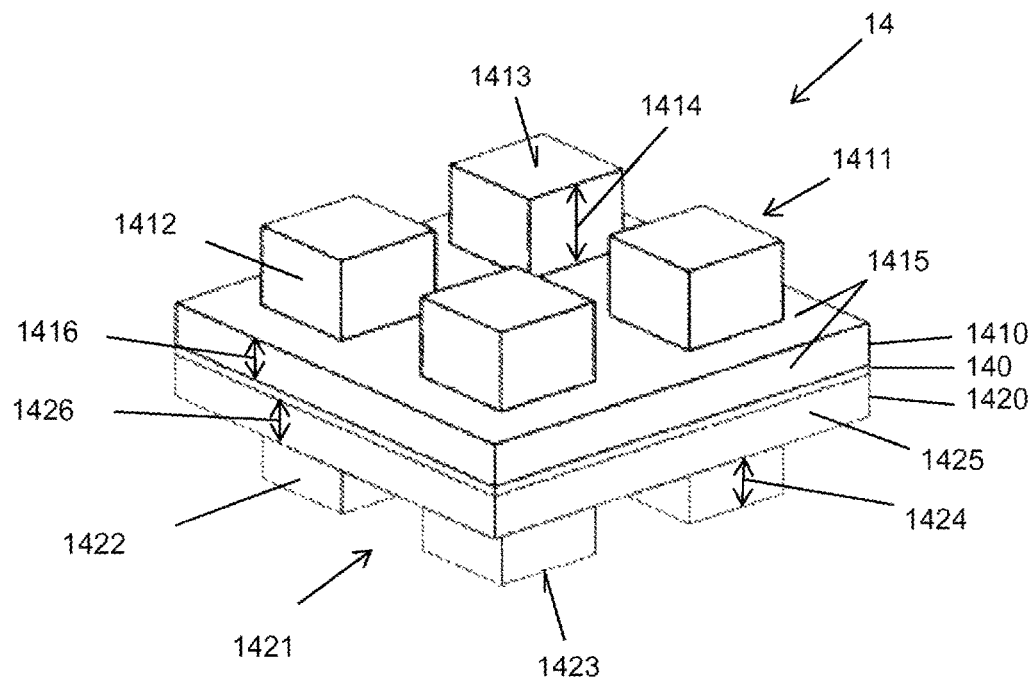
FIG. 2 is a membrane-electrode assembly in oblique view according to one embodiment.

FIG. 2 shows a membrane-electrode assembly 14. The membrane-electrode assembly 14 comprises a membrane structure 140 with an anode layer, a cathode layer, and a membrane layer, wherein the membrane layer is positioned between the anode layer and the cathode layer. An anode-side gas-diffusion layer 1410 is, furthermore, arranged on the anode layer. A cathode-side gas-diffusion layer 1420 is, furthermore, arranged on the cathode layer.

In this embodiment variant, the anode-side gas-diffusion layer 1410 has a first structure 1411 on the side facing away from the membrane structure 140. The first structure 1411 of the anode-side gas-diffusion layer 1410 comprises a plurality of first columns 1412 for forming a laterally-open flow field. This flow field may be designed for the transport of anode operating gases, such as oxygen, air, or other suitable anode operating gases. These first columns 1412 form first support surfaces 1413 which serve to support a bipolar plate 15. Furthermore, in this embodiment variant, the cathode-side gas-diffusion layer 1420 has on the side facing away from the membrane structure 140 a second structure 1421 which, in this embodiment, likewise has a plurality of second columns 1422 for forming a laterally-open flow field, which columns in turn form second support surfaces 1423 for supporting a bipolar plate. This flow field may be designed for the transport of cathode operating gases, such as hydrogen.

However, the embodiments are not limited to both the anode-side gas-diffusion layer 1410 and the cathode-side gas-diffusion layer 1420 being structured. In other embodiments of the membrane-electrode assembly 14, only the anode-side gas-diffusion layer 1410 has a first structure 1411 with first columns 1412 for forming a laterally-open flow field, while the cathode-side gas-diffusion layer 1420 is, for example, flat. In another embodiment of the membrane-electrode assembly 14, only the cathode-side gas-diffusion layer 1420 has a second structure 1421 with second columns 1422 for forming a laterally-open flow field, while the anode-side gas-diffusion layer 1410 is, for example, flat. Accordingly, at least one of the gas-diffusion layers 1410, 1420 is thus always formed with a structure 1411, 1421 provided with columns 1412, 1422.

Advantages result from the columnar elevations in that they behave like springs under compression. Induced voltages are thus also minimized. When used in a fuel-cell stack, an external hardware spring can then be dispensed with, which, advantageously, leads to a significant weight reduction. Carbon-based materials may be used as the material for the gas-diffusion layers 1410, 1420 and their columns 1412, 1422. For example, the gas-diffusion layer may consist of a two-layer, carbon-based, porous material comprising a macroporous carrier material (carbon-fiber paper or carbon cloth) and a thin, microporous, carbon-based layer. In such an embodiment, the carrier material determines the mechanical properties under compression, bending, or shearing. Different morphological states and forms of carbon may also be used, such as carbon nanostructures, graphene or graphene foam, carbon nanotubes, or carbon nanofibers.

In this embodiment, the first columns 1412 and second columns 1422 are positioned such that a second column 1422 is opposite each first column 1412 with respect to the membrane structure 140. In this embodiment, compression results in an increased spring action of the opposing columns 1412, 1422, as a result of which a hardware spring for the fuel-cell stack 10 can be replaced.

In this embodiment, a first height 1414 of the first column 1412 and a second height 1424 of the second column 1422 are, moreover, identical. In other embodiments, the first columns 1412 may differ from the second columns 1422. By way of example only, the first columns 1412 and the second columns 1422 have a square cross-section. However, the embodiments are not limited to a specific cross-sectional shape, but, instead, rectangular or round cross-sections or other suitable cross-sections may also be considered.

The columns 1412, 1422 in the present embodiment form, by way of example, a grid of knob-like or island-like columns 1412, 1422. Accordingly, a flow field that is laterally open is generated as a result. In other words, columns 1412, 1422 in this case merely represent a grid of isolated columns, thereby still forming a connected flow field extending in two dimensions.

The first heights 1414 of the first columns 1412 of the anode-side gas-diffusion layers 1410 may have a value of 350 µm, which corresponds to the value of the second heights 1424 of the second columns 1422 purely by way of example. Furthermore, the anode-side gas-diffusion layer 1410 has a flat first base 1415 with respect to which the first heights 1414 of the first columns 1412 are measured. A first base height 1416 of the first base has a value of 185 µm, purely by way of example. Furthermore, in this embodiment variant, the cathode-side gas-diffusion layer 1420 has a flat second base 1425 with respect to which the second heights 1424 of the second columns 1422 are measured. A second base height 1426 of the second base 1425 has an equal value of 185 µm by way of example.

Figure 3:
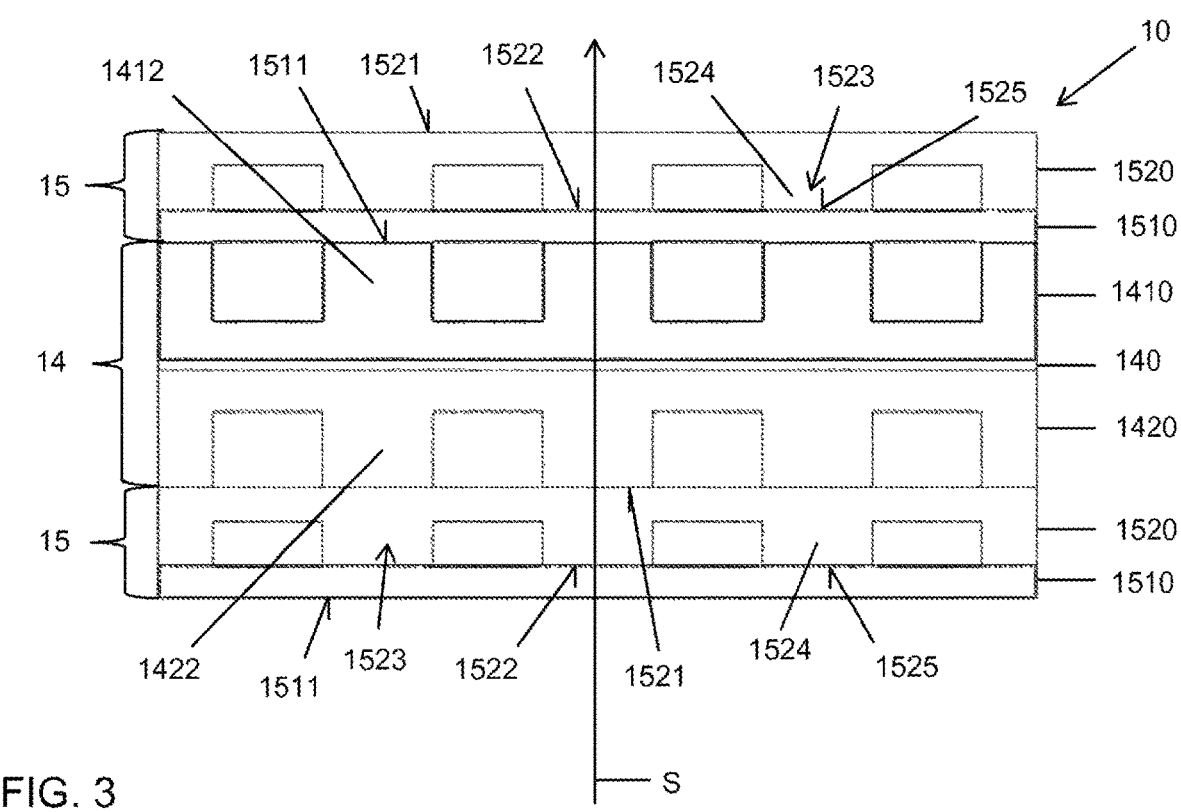
FIG. 3 is a section of a fuel-cell stack in transverse view according to one embodiment.

FIG. 3 furthermore shows, in a side view, a fuel-cell stack 10, or a section of such a fuel-cell stack 10, in accordance with an embodiment. The fuel-cell stack 10 comprises a membrane-electrode assembly 14, which is introduced between two bipolar plates 15. In this case, the stacking of the alternately-arranged bipolar plates 15 and membrane-electrode assemblies 14 of the fuel-cell stack 10 extends along a stacking direction S.

The membrane-electrode assembly 14 positioned between the bipolar plates 15 corresponds to the embodiment described in FIG. 2. For a more detailed description of this membrane-electrode assembly 14 and further embodiment variants, reference is accordingly made to FIG. 2 and the associated description.

Hereinafter, the bipolar plate 15 used in the fuel-cell stack 10 is described in more detail. The bipolar plate 15 comprises an anode plate 1510, the anode side 1511 of which faces the anode-side gas-diffusion layer 1410 of the membrane-electrode assembly 14 or rests against it. The bipolar plate 15 furthermore comprises a cathode plate 1520, the cathode side 1521 of which faces the cathode-side gas-diffusion layer 1420 of the membrane-electrode assembly 14.

In the present embodiment, the anode side 1511 of the anode plate 1510 is flat. In other words, the anode side 1511 is unstructured. The flow field formed by the first structure 1411 of the anode-side gas-diffusion layer 1410 is covered or closed in a stacking direction S by the flat anode side 1511.

Furthermore, in the present embodiment, the cathode side 1521 of the cathode plate 1520 is also flat. In other words, the cathode side 1521 is unstructured. The flow field formed by the second structure 1421 of the cathode-side gas-diffusion layer 1420 is covered or closed in the stacking direction S by the flat cathode side 1521. The result is that the bipolar plate 15 accordingly does not have to have structures for the operating gases, since they already exist in the membrane-electrode assembly 14. Thus, the bipolar plate 15 can have a simpler design.

In other embodiments in which only the cathode-side gas-diffusion layer 1420 of the membrane-electrode assembly 14 is structured, only the cathode side 1521 of the cathode plate 1520 is flat. In other embodiments in which only the anode-side gas-diffusion layer 1410 is structured, only the anode side 1511 of the anode plate 1510 is flat.

Furthermore, in this embodiment, the bipolar plate 15 forms an internal coolant flow field. For this purpose, the coolant side 1522 of the cathode plate 1520 has, by way of example, a third structure 1523. The third structure 1523 comprises corresponding third columns 1524 for forming a laterally-open coolant flow field, which columns in turn have third support surfaces 1525 for supporting the anode plate 1510. In this embodiment, the anode plate 1510 is flat on both sides so that the coolant side of the anode plate 1510 closes or covers the coolant flow field in a stacking direction S.

These simply-structured bipolar plates 15 are particularly stable.

In addition, the third columns 1524 are positioned such that the third columns 1524 are positioned with the first columns 1412 of the membrane-electrode assembly 14 and the second columns 1422 of the membrane-electrode assembly 14 one above the other along the stacking direction S. In other words, the first, second, and third columns 1412, 1422, 1524 form a linear arrangement in the stacking direction S.

When the described fuel-cell stack is compressed, the membrane-electrode assembly 14 is compressed. In this case, the first columns 1412 and the second columns 1422 are each elastically compressed so that the first height 1414 and the second height 1424 are reduced from a value of 350 μm to, for example, a value of, for example, 260-280 μm. The first and second columns 1412, 1422 in combination with the third columns 1524 accordingly have a corresponding spring action, which replaces an additional hardware spring for the fuel-cell stack 10.

A height of the anode plate 1510 is formed, by way of example, with a value of 150 μm. The height of the third column is furthermore, by way of example, 200 μm, and the width of the third column 1524 as well as the second column 1422 and the first column 1412, is, by way of example, 500 μm. These dimensions represent an optimized embodiment variant.

The structural integrity of the membrane-electrode assembly 14 and fuel-cell stack 10 described herein is quantified by means of the finite element method. When the membrane-electrode assembly 14 is compressed by, for example, about 204 μm, which corresponds to an applied pressure of 1.15 MPa, a contact pressure of 200 KPa results at the interface of gas-diffusion layers 1410, 1420 and membrane structure 140, which corresponds to high performance. The maximal induced tensile stresses at the third support surfaces 1525 of the cathode plate 1520 of the bipolar plate 15 are 0.16 MPa in this case. In the case of lateral displacements of the cathode plate 1520 relative to the anode plate 1510, as occurs frequently in the manufacturing process due to tolerances, a maximal induced tensile stress of 3.5 MPa results with a lateral displacement of 250 μm. Furthermore, by means of computational fluid dynamics (CFD), pressure drops of the following values were found for the operating medium flow fields in the gas-diffusion layers 1410, 1420 and the coolant field in the coolant channels: 350 mbar for oxygen, 130 mbar for hydrogen, and 500 mbar for the coolant. Further optimizations can be achieved by improved shaping of the columns. The numerical values achieved demonstrate the improved structural integrity of the proposed membrane-electrode assembly 14 and the proposed fuel-cell stack 10.

In other embodiments, a third structure 1523 may also be formed on the coolant side of the anode plate 1510. In such a case, the cathode plate 1520 is flat on both sides, so that an internal coolant flow field is likewise formed. Alternatively, the bipolar plate 15 may also be integrally formed. Carbon-based materials or mixtures with metals can be used as the material.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An assembly, comprising:
   a membrane assembly having an anode layer, a cathode layer, and a membrane layer positioned between the anode layer and the cathode layer;
   an anode-side gas-diffusion layer arranged on the anode layer;
   a cathode-side gas-diffusion layer arranged on the cathode layer; and
   a bipolar plate,
   wherein at least one of the anode-side gas-diffusion layer and the cathode-side gas-diffusion layer has a first structure on a side facing away from the membrane assembly, and
   wherein the first structure comprises a plurality of first columns for forming a first laterally-open flow field, wherein the first columns have support surfaces for supporting the bipolar plate, and
   wherein a coolant side of the bipolar plate has a second structure including second columns for forming a laterally-open coolant flow field, wherein the second columns are positioned with the first columns one above the other along a stacking direction.

2. The assembly according to claim 1, wherein the anode-side gas-diffusion layer has the first structure on a side facing away from the membrane assembly, and the cathode-side gas-diffusion layer has a third structure on a side facing away from the membrane assembly, wherein the first structure comprises the plurality of first columns for forming the first laterally-open flow field, wherein the first columns have support surfaces for supporting the bipolar plate, and the third structure comprises a plurality of third columns for forming a second laterally-open flow field, wherein the third columns have support surfaces for supporting a second bipolar plate.

3. The assembly according to claim 2, wherein the first columns and third columns are positioned such that one third column is positioned opposite each first column with respect to the membrane assembly.

4. The assembly according to claim 2, wherein the first columns have a first height and the third columns have a second height, wherein the first height and/or the second height is 250-450 µm.

5. The assembly according to claim 4, wherein the first height and/or the second height is 300-400 µm.

6. The assembly according to claim 4, wherein the first height and/or the second height is 350 µm.

7. A fuel-cell stack comprising a stack of bipolar plates and membrane-electrode assemblies alternately arranged between two end plates, each membrane electrode assembly including:
   a membrane assembly having an anode layer, a cathode layer, and a membrane layer positioned between the anode layer and the cathode layer;
   an anode-side gas-diffusion layer arranged on the anode layer; and
   a cathode-side gas-diffusion layer arranged on the cathode layer,
   wherein at least one of the anode-side gas-diffusion layer and the cathode-side gas-diffusion layer has a first structure on a side facing away from the membrane assembly,
   wherein the first structure comprises a plurality of first columns for forming a laterally-open flow field, wherein the first columns have support surfaces for supporting a first one of the bipolar plates, and
   wherein a coolant side of the first one of the bipolar plates has a second structure including second columns for forming a laterally-open coolant flow field, wherein the second columns are positioned with the first columns one above the other along a stacking direction.

8. The fuel-cell stack according to claim 7, wherein each bipolar plate comprises an anode plate, the anode side of which faces the anode-side gas-diffusion layer of the membrane-electrode assemblies, and a cathode plate, the cathode side of which faces the cathode-side gas-diffusion layer of the membrane-electrode assemblies, wherein the anode side of the anode plate and/or the cathode side of the cathode plate are flat.

9. The fuel-cell stack according to claim 7, wherein either the anode plate or the cathode plate is flat on both sides.

10. A vehicle having a fuel-cell system with a fuel-cell stack comprising a stack of bipolar plates and membrane-electrode assemblies alternately arranged between two end plates, each membrane electrode assembly including:
   a membrane assembly having an anode layer, a cathode layer, and a membrane layer positioned between the anode layer and the cathode layer;
   an anode-side gas-diffusion layer arranged on the anode layer; and
   a cathode-side gas-diffusion layer arranged on the cathode layer,
   wherein at least one of the anode-side gas-diffusion layer and the cathode-side gas-diffusion layer has a first structure on a side facing away from the membrane assembly,
   wherein the first structure comprises a plurality of first columns for forming a laterally-open flow field, wherein the first columns have support surfaces for supporting a first one of the bipolar plates, and
   wherein a coolant side of the first one of the bipolar plates has a second structure including second columns for forming a laterally-open coolant flow field, wherein the second columns are positioned with the first columns one above the other along a stacking direction.

* * * * *